United States Patent Office  3,094,434
Patented June 18, 1963

3,094,434
MANUFACTURE OF POLYMERIC MATERIALS
John Frederick Chapman, John Henry Cundall, and John Alexander Partridge, all of Manchester, England, assignors to Imperial Chemical Industries Limited, London, England, a corporation of Great Britain
No Drawing. Filed Aug. 12, 1959, Ser. No. 833,134
Claims priority, application Great Britain Aug. 15, 1958
12 Claims. (Cl. 117—106)

This invention relates to improvements in or relating to the manufacture of polymeric materials, and more particularly to the manufacture of polyurethanes.

It is known to make polyurethanes by reacting together a compound containing two or more isocyanate groups and a hydroxyl containing polyether made by reacting a 1:2-alkylene oxide such as ethylene oxide or propylene oxide with a hydroxy compound, for example water, a diol such as ethylene glycol, diethylene glycol or propylene glycol, or a polyol such as glycerol or trimethylol propane.

For some purposes, however, it is desirable that the reaction should proceed rapidly and the known processes are not entirely satisfactory in this respect. Thus, it is commercially desirable to be able to apply the ingredients, from which a foam is to be made, in a finely divided state as for example by spraying. This method is a simple and economical way of producing a relatively thin layer of foam, for purposes such as thermal or acoustic insulation, on structures which may be of complicated shape. For such a method of application, particularly when spraying onto vertical surfaces, the foam forming ingredients must react together very rapidly, so that it is generally necessary to add relatively large quantities of compounds of a basic nature, such as tertiary amines, which catalyse reaction of the isocyanate. The compositions containing much tertiary amine catalyst have the disadvantage of being toxic and malodorous. It is sometimes difficult to obtain the necessary concentration of inorganic catalysts, such as potassium acetate, because of their poor solubility in the resin. So far it has proved difficult to devise foam-forming mixtures which are suitable for this application, combine simplicity of operation with rapidity of foam-formation, and result in satisfactory foams.

We have now found that hydroxyl-containing polyethers which also contain tertiary amino groups are very reactive with isocyanates and that these polyethers are especially useful in the manufacture of foams by spraying techniques in that their use results in the formation of foams of extremely fine texture and low density without the necessity for the use of catalysts.

Thus according to our invention we provide a process for the manufacture of polyurethane materials by the interaction of an organic polyisocyanate, a hydroxyl-containing polyether and optionally water, characterised in that the polyether, in addition to containing two or more hydroxyl groups, also contains at least one tertiary amino group.

The tertiary amino groups may be any groups comprising a nitrogen atom which is linked directly only to carbon atoms, and may optionally form part of a heterocyclic ring.

The polyethers containing tertiary amino groups, suitable for use in the process of the present invention, include the products made by reacting 1:2-alkylene oxides with ammonia or with compounds containing at least one primary or at least two secondary amino groups. Thus there may be mentioned for example the polyethers made by reacting ethylene oxide or 1:2-propylene oxide or mixtures thereof, with ammonia or with aliphatic, araliphatic or cycloaliphatic primary or secondary amines. A preferred class of compounds for this purpose comprises ammonia, piperazine and amino compounds of the formula $H_2N [R—NH]_n R—NH_2$ wherein R represents hydrocarbon groups which may be the same or different, and which may be aliphatic, araliphatic or cycloaliphatic and wherein $n$ is a whole number having a value of 0 to 5.

As examples of the compounds from which the polyethers may be made there may be mentioned for example ammonia, and amines such as methylamine, cyclohexylamine, piperazine, benzylamine, phenylethylamine, di-(aminomethyl)benzene, di(aminoethyl)benzene, ethylenediamine, hexamethylene diamine, diethylene triamine, triethylene tetramine, tetraethylene pentamine and bis-(ω-aminohexyl)amine. There may also be used amines in which there are present other groups reactive towards alkylene oxides, for example hydroxyl groups, as for example 2-amino-2-(hydroxymethyl)-propanediol-1:3.

It is preferred that the total amount of 1:2-alkylene oxide reacted with the ammonia or the compounds containing primary or secondary amino groups is in the range of 2 to 40 molecular proportions of the 1:2-alkylene oxide for each equivalent proportion of reactive hydrogen in the amino compound. Smaller proportions of the 1:2-alkylene oxide may be used if desired but the derived hydroxy compounds react so vigorously with isocyanates that they are less suitable in spraying applications, larger proportions lead to polyethers or excessive molecular weight and low reactivity.

If desired, the ammonia or the compound containing primary or secondary amino groups may be reacted with the 1:2-alkylene oxide in more than one stage, and the same or a different 1:2-alkylene oxide may be used in the various stages. Thus, for example, an intermediate product such as mono-, di- or tri-ethanolamine or mono-, di- or tri-propanolamine may be prepared, and this may be further reacted with ethylene oxide or propylene oxide. The condensation in the different stages may be to any convenient extent, and need not necessarily produce single compounds at any stage. Furthermore, any intermediate product obtainable in this way may, if desired, be made by any available alternative method and then reacted with the 1:2-alkylene oxide.

The polyethers may be made for example by methods well known in the art. For example, an aqueous or alcoholic solution of the amino compound may be first reacted with a 1:2-alkylene oxide at 70°–100° C. and 5.50 lbs/sq. in. pressure until the corresponding hydroxyalkylamine results, and then an alkaline catayslt such as potassium hydroxide may be added, the water or alcohol removed by distillation, and more propylene oxide added at 100°–140° C. and 5–50 lbs./sq. in. pressure until a polyether of the desired molecular weight is formed.

The reactivity of these polyethers with isocyanates depends to some extent upon their tertiary amino content and the molecular weight of the polyether, and a low molecular weight polyether made from a particular alkylene oxide and amine will usually be more reactive than a higher molecular weight polyether made from the same intermediates. If desired, the high reactivity of the polyethers containing tertiary amino groups may be modified by using them in admixture with other polyethers or polyesters which are free from tertiary amino groups. In this way it is possible to make foam-forming compositions of any desired degree of reactivity, including compositions which may be used in a batch process or in a continuous dispensing process where a longer mixing time is necessary.

Additional ingredients may be added to the foam-forming mixture if desired. Thus there may be incorporated in the mixture organic or inorganic pigments, fillers, flame-retarders, for example tri-(β-chloroethyl)phosphate, extenders, for example tricresyl phosphate, structure modifiers, and emulsifying agents, for example soaps or ethylene oxide condensates.

In the manufacture of foamed products by the process of our invention the amount of water required will vary considerably with the particular ingredients selected, but may be up to 20% and is preferably between 2% and 10% by weight of the polyether.

As examples of organic polyisocyanates there may be mentioned tolylene-2:4-diisocyanate, mixtures of tolylene-2:4- and -2:6-diisocyanates, diphenylmethane diisocyanates, 4:4'-diisocyanato-3-methyldiphenylmethane, m- and p-phenylene diisocyanates, chlorophenylene-2:4-diisocyanate, and mixtures thereof. Triisocyanates may be used in admixture with the diisocyanates, for example 2:4:6-triisocyanatotoluene, 4:4':4''-triphenylmethane triisocyanate, 2:4:4'-triisocyanatodiphenyl ether and polymers of tolylene-2:4-diisocyanate, but it is preferred to use as the polyisocyanate a polyisocyanate composition comprising a major proportion of diarylmethane diisocyanate and at least 5% by weight of polyisocyanate of functionality greater than two. Suitable diarylmethane diisocyanates include for example diphenylmethane diisocyanate and phenyltolylmethane diisocyanate, and may be made for example by phosgenating the corresponding diamines or the polyamine compositions obtained by condensing formaldehyde with aromatic amines or mixtures thereof.

If desired there may also be included in the reaction mixture a catalyst, for example a tertiary amine, as is the practice in the art, but in general the reactivity of the polyethers containing tertiary amino groups is so high that addition of catalyst is neither desirable nor necessary.

By the process of the present invention there may be prepared easily and conveniently polyurethane foamed materials in the form of coatings applied by spraying techniques. These coatings possess good, uniform texture and low density. Furthermore, the polyethers containing tertiary amino groups are of relatively low viscosity compared with for example polyesters of similar molecular weight, and therefore in application from a spray gun are more readily capable of atomisation without the application of heat. The process of the present invention may also be used for the manufacture of polyurethane materials in a wide variety of forms, which may be rigid or flexible, solid or cellular, for example rubbers, films, surface coatings, potting compounds, bonding compositions and the like.

The invention is illustrated but not limited by the following examples in which the parts and percentages are by weight.

*Example 1*

A resin mixture is made by stirring together 8 parts of water, 15 parts of tri-($\beta$-chloroethyl)phosphate, 5 parts of the product obtained by reacting 2.5 mol. of ethylene oxide with 1 mol. of a cetyl/oleyl alcohol mixture, and 100 parts of the polyether made as described below. This resin mixture and a 4:4'-diisocyanatodiphenylmethane composition prepared by phosgenating crude diamino diphenylmethane, containing about 15% of polyamines (mainly triamines) obtained by condensing formaldehyde with aniline in the presence of hydrochloric acid, are fed by means of metering units to a twin-feed spray gun in the ratio of 130 parts by volume of the resin mixture to 100 parts by volume of the isocyanate composition, both resin and isocyanate being at approximately 20° C. The resulting mixture is sprayed onto vertical panels using an atomising air pressure of 100 lb./sq. in. to give a film which reacts in 3–4 seconds to form a layer of rigid foam about half an inch in thickness and having a fine and even texture, and a density of 3.5 lb./cubic foot.

The polyether used in the process of this example is made as follows:

1192 parts of triethanolamine and 12 parts of potassium hydroxide are charged to a stainless steel pressure vessel and heated for 1 hour at 100° C. and 29 inches mercury gauge vacuum with a slow stream of nitrogen passing through the mixture. The vessel is then sealed and propylene oxide is fed into the vessel from a pressurised cylinder until a pressure of 25–30 lbs./sq. in. is registered. The initial reaction with propylene oxide is exothermic and the mixture is maintained at 100° C. whilst propylene oxide is fed into the reaction vessel to maintain a pressure of 25–30 lbs./sq. in. After 2 hours, when the reaction has become less exothermic, the temperature of the reaction mixture is raised to 120° C. and the addition of propylene oxide is continued for a further 4½ hours until a total of 2308 parts have been added. The addition of propylene oxide is then stopped, the pressure in the reaction vessel is released and the temperature of the reaction mixture is reduced to 100° C. 104 parts of activated carbon are added and the mixture is heated for 1 hour at 100° C. and 29 inches mercury gauge vacuum and then filtered hot through a steam-heated pressure filter to yield 3200 parts of an amber coloured liquid having the following characteristics: (a) viscosity at 25° C.=312 centistokes, (b) hydroxyl value=12.2%, (c pH of a 10% solution in 50% aqueous alcohol=10.2, (d) moisture content=0.17%.

*Example 2*

80 parts of a liquid polyether (A) made by the reaction of 1193 parts of propylene oxide with 750 parts of trimethylolpropane, 20 parts of a liquid polyether (B) made by the reaction of 1095 parts of propylene oxide with 743 parts of tetrakis-($\beta$-hydroxyethyl)-ethylenediamine, 5 parts of the product obtained by the reaction of a cetyl/oleyl alcohol mixture with 2.5 molecular proportions of ethylene oxide and 4 parts of water are mixed together with stirring. 173 parts of the diphenylmethane diisocyanate composition used in Example 1 are then added and the mixture is stirred rapidly for 50 seconds and then is poured into a mould. The mixture foams rapidly in the mould and quickly sets to a rigid foam of fine texture and having a density of 2.6 lbs. per cubic foot and a compression strength of 140 lb. per 2 inch cube.

The liquid polyether (A) used in this example has a molecular weight of 354, a hydroxyl value of 475 mg. KOH/gm. and a viscosity of 1152 centistokes at 25° C. The liquid polyether (B) has a molecular weight of 578, a hydroxyl value of 389 mg. KOH/gm. and a viscosity of 915 centistokes at 25° C.

*Example 3*

To a mixture of 90 parts of the liquid polyether (A) of Example 2 and 10 parts of the liquid polyether (B) of Example 2 are added 4 parts of water, and 5 parts of the product obtained by the reaction of a cetyl-oleyl alcohol mixture with 2.5 molecular proportions of ethylene oxide. This mixture is thoroughly stirred and then 175 parts of the diphenyl methane diisocyanate composition of Example 1 are added, and rapid mixing is carried out for 75 seconds. The mix is poured immediately into a mould where it rises rapidly to give a rigid foam of density 2.47 lbs. per cubic foot, compression strength 125 lbs. per 2 inch cube, and uniform cellular structure.

*Example 4*

To 100 parts of the liquid polyether (B) described in Example 2 are added 4 parts of water, 5 parts of the product obtained by the reaction of a cetyl/oleyl alcohol mixture with 2.5 molecular proportions of ethylene oxide, and 1 part of finely powdered antimony oxide. The mixture is thoroughly stirred, 160 parts of the diphenylmethane diisocyanate composition of Example 1 are added, and brisk stirring is carried out for a further 15 seconds. The mixture foams extremely rapidly to give a fine-textured rigid foam with good resilience, density 2.5 lbs. per cubic foot and compression strength 100 lbs. per 2 inch cube.

Example 5

To 100 parts of the liquid polyether (B) described in Example 2 are added 6 parts of water, 5 parts of the product obtained by the reaction of a cetyl/oleyl alcohol mixture with 2.5 molecular proportions of ethylene oxide and 2 parts of finely divided antimony oxide. The mixture is thoroughly agitated, 180 parts of the diphenylmethane diisocyanate composition of Example 1 are added and stirring is continued for a further 20 seconds. The mixture then foams rapidly to give a uniform, fine-textured, rigid foam of good resilience, and density 1.7 lbs. per cubic foot.

Example 6

150 parts of a liquid polyether prepared by the addition of ethylene and propylene oxides to ethylene diamine, and having a hydroxyl value of 61 mg. KOH/gm. and an ethylene oxide content of 10%, are stirred with a mixture of 4.5 parts of water, 2.25 parts of dimethylcyclohexylamine and 4.5 parts of the condensate of 1 mol. of a cetyl/oleyl alcohol mixture with 2.5 mols. of ethylene oxide. 59 parts of an 80/20 mixture of tolylene-2:4- and -2:6-diisocyanates are added and stirring continued until mixing is complete. The still fluid mixture is poured into a mould where it foams and cures rapidly. The product is a highly resilient, elastic foam of density 0.04 gm. per cubic centimetre.

Example 7

100 parts of the reaction product of triethanolamine and ethylene oxide in the ratio of 1477 parts to 2773 parts respectively, and having a hydroxyl value of 432 mg. KOH/gm. are mixed with 8 parts of water and 15 parts of β-trichloroethyl phosphate. The mixture is cooled to 2° C. and 280 parts of the 4:4′-diisocyanato-diphenyl methane composition of Example 1, containing 2% of a block copolymer of ethylene oxide and propylene oxide containing 10% of ethylene oxide, are added. The mixture is agitated with a high speed stirrer for 15 seconds and is poured into a mould, where foaming takes place immediately. The product is a rigid cellular structure having a density of 1.0 pound per cubic foot.

Example 8

The procedure of Example 7 is repeated using in place of the diphenylmethane diisocyanate composition, a 4:4′-diisocyanato - 3 - methyldiphenylmethane composition. Mixing of the resin and isocyanate components is conveniently carried out at room temperature for a period of 15 seconds, when foaming takes place immediately. The product is a rigid cellular structure having a density of 1.2 pounds per cubic foot.

The 4:4′-diisocyanato-3-methyldiphenylmethane composition used in this example is prepared by phosgenating crude 4:4′-diamino-3-methyldiphenylmethane, containing about 15% of polyamines (mainly triamines) obtained by condensing aniline, o-toluidine and formaldehyde in the molecular proportions 3.3:1.1:1.0 in the presence of hydrochloric acid.

Example 9

100 parts of the reaction product of triisopropanolamine and ethylene oxide in the ratio of 700 parts to 884 parts respectively, having a hydroxyl value of 386 mg. KOH per gm., are mixed with 8 parts of water and 15 parts of β-trichloroethyl phosphate.

250 parts of the 4:4′-diisocyanato diphenyl methane composition of Example 1 containing 2% of an ethylene oxide/propylene oxide block copolymer containing 10% by weight of ethylene oxide, are added and the mixture is agitated with a high speed stirrer for 30 seconds. The blend is poured into a mould, where foaming takes place to give a rigid cellular structure having a density of 1.6 pounds per cubic foot.

Example 10

100 parts of the reaction product of triisopropanolamine and propylene oxide in the ratio of 1698 parts to 2715 parts respectively, and having a hydroxyl value of 430 mg. KOH/gm., are mixed with 8 parts of water and 15 parts of β-trichloroethyl phosphate.

260 parts of the 4:4′-diisocyanato diphenyl methane composition of Example 1 containing 5% of an ethylene oxide/propylene oxide block copolymer containing 10% of ethylene oxide are added and the mixture is agitated with a high speed stirrer for 30 seconds. The blend is poured into a mould where foaming takes place to give a rigid cellular structure having a density of 1.6 pounds per cubic foot.

Example 11

100 parts of the reaction product of hepta-bis-hydroxypropyl tetraethylene pentamine and propylene oxide in the ratio of 2020 parts to 1255 parts respectively, and having a hydroxyl value of 395 mg. KOH per gm. are mixed with 6 parts of water and 15 parts of β-trichloroethyl phosphate. 175 parts of the 4:4′-diisocyanato diphenyl methane composition of Example 1 containing 2% of an ethylene oxide/propylene oxide block copolymer containing 10% of ethylene oxide, are added and the mixture is agitated with a high speed stirrer for 15 seconds. The blend is poured into a mould where rapid foaming takes place, giving a rigid cellular structure having a density of 2.5 pounds per cubic foot.

Example 12

40 parts of a linear polyether resin, made by reacting 190 parts of N-methyl diethanolamine and 7 parts of potassium hydroxide with 1940 parts of propylene oxide, and having a hydroxyl valve of 97.7 mg. KOH/gm. and a viscosity of 196 centistokes at 25° C., and 60 parts of a polypropylene glycol having a hydroxyl value of 56 mg. KOH/gm., and a viscosity of 320 centistokes at 25° C. are dried by stirring at about 110° C. under reduced pressure. 16 parts of a 65:35 mixture of tolylene-2:4- and -2:6-diisocyanates are added to the mixture of polyethers at 70° C. and the mixture stirred for 3 minutes under a pressure of 10 mms. of mercury. The mixture is poured into a mould and cured for 3 hours at 100° C. A highly resilient elastomeric product with a hardness of 15° Shore is obtained.

Example 13

80 parts of a polypropylene glycol having a hydroxyl value of 112 mg. KOH/gm. and a viscosity of 140 centistokes at 25° C., and 20 parts of a branched polyether resin, made by reacting 130 parts of tetra(β-hydroxyl ethyl)ethylene diamine and 5 parts of potassium hydroxide with 1002 parts of propylene oxide, and having a hydroxyl value of 90.8 mg. KOH/gm. and a viscosity of 415 centistokes at 25° C., are dried by stirring at about 110° C. under reduced pressure. 12 parts of a 65:35 mixture of tolylene-2:4- and -2:6-diisocyanates are added to the mixture of polyethers at 70° C. and the mixture is stirred for 3 minutes under a pressure of 10 mms. of mercury.

The mixture is poured into a mould and cured at 100° C. for 3 hours. The resilient elastomeric product has a hardness of 20° Shore.

What we claim is:

1. A process for the manufacture of foamed polyurethane materials in a single stage which consists essentially of simultaneously contacting as the sole reacting materials water, an organic polyisocyanate and a hydroxyl-containing polyether containing at least two hydroxyl groups and at least one tertiary amino group and having a molecular weight of less than 1000, said polyether being the reaction product of a compound selected from the group consisting of ammonia and aliphatic, araliphatic and cycloaliphatic primary and secondary amines having at least 2 available active hydrogen atoms attached to nitrogen in each molecule with 2 to 40 moles per available active hydrogen of a 1:2 alkylene oxide selected from the group consisting of ethylene oxide and propylene oxide.

2. A process for the manufacture of polyurethane materials as set forth in claim 1 in which the polyether is the product of the reaction of 1:2-alkylene oxide with a compound selected from the group consisting of ammonia, piperazine and amino compounds of the formula $$H_2N-(R_1-NH)_n-R_2NH_2$$

in which $R_1$ and $R_2$ represent hydrocarbon groups selected from the group consisting of aliphatic, arylaliphatic and cycloaliphatic, wherein $n$ is a whole number having a value from 0 to 5.

3. A process for the manufacture of foamed polyurethane products as set forth in claim 1 wherein the water is present in an amount not exceeding 20% by weight of the polyether.

4. A process for the manufacture of foamed polyurethane as set forth in claim 3 wherein the amount of water is between 2% and 10% by weight of the polyether.

5. A process for the manufacture of polyurethane materials as claimed in claim 1 wherein the organic polyisocyanate is a polyisocyanate composition comprising a major proportion of diarylmethane diisocyanate and at least 5% by weight of polyisocyanate having more than two isocyanate groups per molecule.

6. A process for the manufacture of polyurethane materials as claimed in claim 1 in which the polyurethane foamed materials are applied in the form of coatings by spraying techniques.

7. A process for the manufacture of foamed polyurethane materials as set forth in claim 1 in which said polyether is oxypropylated triethanolamine.

8. A process for the manufacture of foamed polyurethane materials as set forth in claim 1 in which said polyether is oxyethylated triethanolamine.

9. A process for the manufacture of foamed polyurethane materials as set forth in claim 1 in which said polyether is oxyethylated triisopropanolamine.

10. A process for the manufacture of foamed polyurethane materials as set forth in claim 1 in which said polyether is oxypropylated triisopropanolamine.

11. A process for the manufacture of foamed polyurethane materials as set forth in claim 1 in which said polyether is oxypropylated tetrakis (hydroxyethyl) ethylene diamine.

12. A process for the manufacture of foamed polyurethane materials as set forth in claim 1 in which said polyether is oxypropylated heptakis (hydroxypropyl) tetraethylene pentamine.

References Cited in the file of this patent

UNITED STATES PATENTS

| 2,915,496 | Swart et al. | Dec. 1, 1959 |
| 2,927,905 | Eckert | Mar. 8, 1960 |
| 2,948,691 | Windemuth | Aug. 9, 1960 |
| 2,959,618 | Kyrides | Nov. 8, 1960 |

FOREIGN PATENTS

| 205,456 | Australia | Feb. 10, 1955 |

OTHER REFERENCES

E. I. du Pont de Nemours & Co., Wilmington, Delaware, "Continuous Preparation of Urethane Foam Prepolymer," HR-29, July 1958.